(12) United States Patent
Springfield et al.

(10) Patent No.: US 8,898,355 B2
(45) Date of Patent: Nov. 25, 2014

(54) DISKLESS CLIENT USING A HYPERVISOR

(75) Inventors: Randall S. Springfield, Chapel Hill, NC (US); Daryl Cromer, Cary, NC (US); Howard Locker, Cary, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/693,515

(22) Filed: Mar. 29, 2007

(65) Prior Publication Data

US 2008/0244096 A1 Oct. 2, 2008

(51) Int. Cl.
| | |
|---|---|
| G06F 13/12 | (2006.01) |
| G06F 13/38 | (2006.01) |
| G06F 3/00 | (2006.01) |
| G06F 5/00 | (2006.01) |
| G06F 9/44 | (2006.01) |

(52) U.S. Cl.
CPC .................................. *G06F 9/4416* (2013.01)
USPC .................................. 710/65; 710/5; 710/40

(58) Field of Classification Search
USPC ...................... 710/31, 52, 5, 40, 65
See application file for complete search history.

(56) References Cited

U.S. PATENT DOCUMENTS

| | | | |
|---|---|---|---|
| 4,780,821 A * | 10/1988 | Crossley | 718/100 |
| 5,659,756 A | 8/1997 | Hefferon et al. | |
| 6,629,162 B1 | 9/2003 | Arndt et al. | |
| 6,678,712 B1 | 1/2004 | McLaren et al. | |
| 6,701,455 B1 * | 3/2004 | Yamamoto et al. | 714/18 |
| 6,735,601 B1 * | 5/2004 | Subrahmanyam | 707/200 |
| 7,093,035 B2 * | 8/2006 | Hashimoto | 710/36 |
| 7,360,072 B1 | 4/2008 | Soltis et al. | |
| 2002/0010811 A1 | 1/2002 | Arndt et al. | |
| 2002/0095437 A1 | 7/2002 | Sugiyama | |
| 2002/0124127 A1 | 9/2002 | Dawkins et al. | |
| 2002/0157001 A1 | 10/2002 | Huang et al. | |
| 2003/0037189 A1 * | 2/2003 | Morgan | 710/36 |
| 2003/0159086 A1 | 8/2003 | Arndt | |
| 2003/0204708 A1 | 10/2003 | Hulme et al. | |
| 2005/5144431 | 6/2005 | Ray-Hsin Lin | |
| 2005/0193189 A1 | 9/2005 | Kim | |
| 2005/0204186 A1 * | 9/2005 | Rothman et al. | 714/7 |
| 2005/0283640 A1 | 12/2005 | Cheston et al. | |
| 2006/0010314 A1 | 1/2006 | Xu | |
| 2006/0021032 A1 | 1/2006 | Challener et al. | |

(Continued)

FOREIGN PATENT DOCUMENTS

| | | |
|---|---|---|
| CN | 101276283 A | 10/2008 |
| CN | 101661398 A | 3/2010 |

(Continued)

OTHER PUBLICATIONS

"Operating system choice based on connection domain", taken from IP.COM, Journal Jun. 20, 2003, XP 013008895.

(Continued)

*Primary Examiner* — Farley Abad
(74) *Attorney, Agent, or Firm* — Ference & Associates LLC

(57) ABSTRACT

An arrangement for facilitating remote booting in diskless client systems as just described. To this end, there is broadly contemplated herein the employment of a hypervisor that can freely accommodate a variety of booting arrangements for a given OS. This then ensures that few if any modifications, especially costly ones, would need to be made to the OS to ensure greater versatility.

20 Claims, 3 Drawing Sheets

(56) References Cited

U.S. PATENT DOCUMENTS

| | | | |
|---|---|---|---|
| 2006/0021041 | A1 | 1/2006 | Challener et al. |
| 2006/0143417 | A1 | 6/2006 | Poisner et al. |
| 2007/0005816 | A1 | 1/2007 | Diamant et al. |
| 2007/0006049 | A1* | 1/2007 | Agha et al. ............ 714/43 |
| 2007/0011445 | A1 | 1/2007 | Waltermann et al. |
| 2007/0038996 | A1* | 2/2007 | Ben-Yehuda et al. ........ 718/1 |
| 2007/0050767 | A1* | 3/2007 | Grobman et al. ........ 718/1 |
| 2007/0266389 | A1* | 11/2007 | Ganguly et al. ........ 718/104 |
| 2008/0059556 | A1* | 3/2008 | Greenspan et al. ........ 709/201 |
| 2008/0148389 | A1* | 6/2008 | Locker et al. ........ 726/17 |
| 2008/0244096 | A1 | 10/2008 | Springfield et al. |
| 2009/0172136 | A1 | 7/2009 | Schulz et al. |

FOREIGN PATENT DOCUMENTS

| | | |
|---|---|---|
| DE | 102005030529 | 1/2007 |
| EP | 1424628 | 6/2004 |
| EP | 1507188 A2 | 2/2005 |
| EP | 2230597 A1 | 9/2010 |
| JP | S64-004838 | 10/1989 |
| JP | 2005-222123 | 8/2005 |
| JP | 2005-284497 | 10/2005 |
| JP | 3138119 | 12/2007 |
| WO | 2007003152 | 1/2007 |

OTHER PUBLICATIONS

Goldberg, R. P., "Survey of Virtual Machine Research", Computer, Jun. 1974, vol. 7, No. 6, pp. 34-45.

Website, 7 pages, available at http://en.wikipedia.org/wiki/Hypervisor, as of Mar. 1, 2011.

International Search Report, mailing date Feb. 6, 2009, Austrian Patent Office.

Wenyuan Kuang et al, "A novel centralized managed computing system for heterogeneous Oses". Proceedings of the 2007 First International Symposium on Information Technologies and Applications in Education (ISIT AE 2007). Nov. 23-25, 2007, pp. 428 to 433.

* cited by examiner

TYPE 1 HYPERVISOR

DISKLESS CLIENT USING A HYPERVISOR

FIELD OF THE INVENTION

The present invention relates to diskless clients and their effective and cost-efficient management.

BACKGROUND OF THE INVENTION

The paradigm of desktop computers connected to a common server has long suffered from problems relating to cost and manageability. Primarily, significant concerns regarding security constantly arise given that each desktop has a hard drive, thus facilitating the unauthorized copying or downloading of files and greatly increasing the risk of system corruption in view of the difficulties with managing what may be introduced to each desktop.

Accordingly, an ongoing trend among smaller and larger enterprises alike is to provide a diskless client that eliminates the multitude of desktop hard drives. All data thus is found on a central server, and all file management can be controlled at the one central location. System backup is greatly facilitated since a multitude of desktops do not need to be activated at the time that backup is carried out, and any needed "patch management" can be carried out at the server end.

However, a major impediment to implementing the changes just described is that most operating systems (OS's) are not conducive to the type of remote booting that would normally be required in a diskless system. By and large, each OS tends to be configured for a specific type of booting that often requires some type of local storage, and thus lacks versatility in terms of the booting that can be accommodated. For instance, during a boot, the OS would have to be cognizant of whether the boot originates from remote storage or local storage, wirelessly, or from a LAN (local area network). Costly fixes generally need to be implemented to permit any appreciable degree of versatility.

Accordingly, a compelling need has been recognized in connection with addressing these versatility issues, as well as related issues.

SUMMARY OF THE INVENTION

In accordance with at least one presently preferred embodiment of the present invention, there is broadly contemplated herein an arrangement for facilitating remote booting in diskless client systems as just described. To this end, there is broadly contemplated herein the employment of a hypervisor that can freely accommodate a variety of booting arrangements for a given OS. This then ensures that few if any modifications, especially costly ones, would need to be made to the OS to ensure greater versatility.

In summary, one aspect of the invention provides a system comprising: an operating system; a remote storage device in general communication with the operating system; and a hypervisor which captures communication actions from the operating system and diverts the communication actions to the remote storage device.

Another aspect of the invention provides a method comprising: loading an operating system; loading a hypervisor; and employing the hypervisor to: capture communication actions from the operating system; and divert the communication actions to a remote storage device.

Furthermore, an additional aspect of the invention provides a program storage device readable by machine, tangibly embodying a program of instructions executable by the machine to perform method steps comprising: loading an operating system; loading a hypervisor; and employing the hypervisor to: capture communication actions from the operating system; and divert the communication actions to a remote storage device.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

As discussed above, there is broadly contemplated herein, in accordance with at least one presently preferred embodiment of the present invention, the employment of a hypervisor in a diskless client system to more efficiently facilitate and greatly expand the booting capabilities of an OS. More particularly, the hypervisor preferably "traps" (in a manner to be described below) all disk and LAN accesses from the OS.

Expressed another way, to the extent that many OS's are normally configured to write to hard drive during a boot, and to the extent one may wish to incorporate such an OS into a diskless system, a hypervisor in accordance with the present invention obviates the need to expensively reconfigure the OS for a diskless environment in which the booting context will be significantly different. Any and all translation to remote storage, as performed by the hypervisor, is thus essentially "blind" to the OS.

Conventionally, a hypervisor is embodied by a base set of code that runs under an OS to permit an OS to run in a virtualized environment, and can create a virtualized environment for a "Guest OS" (such as Microsoft XP). It thus allows OS's to run on the same hardware concurrently.

Figure 1:
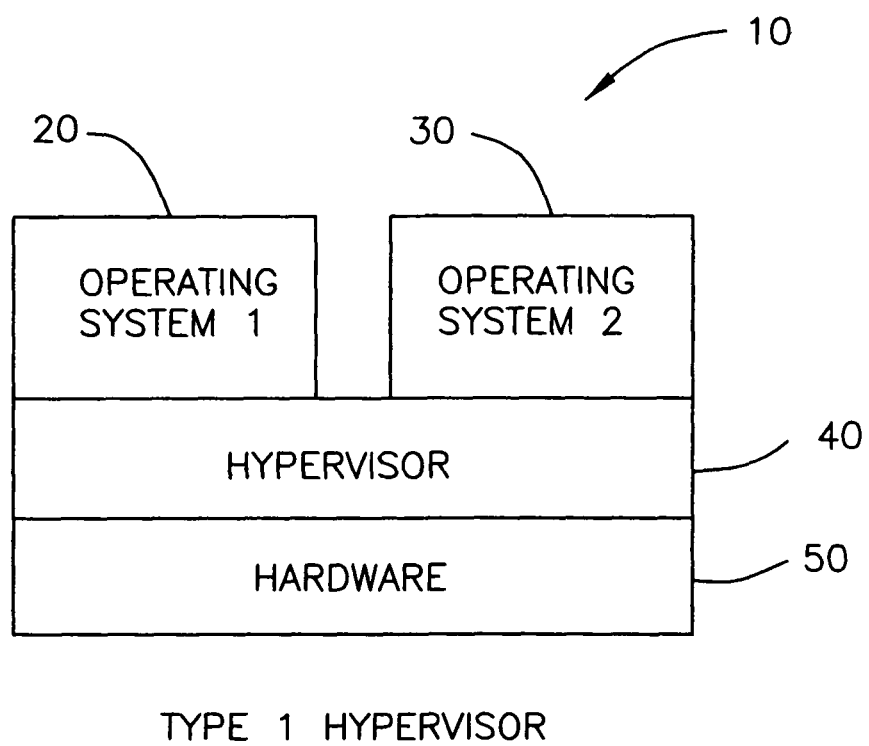
FIG. 1 schematically illustrates a Type 1 hypervisor.
Figure 2:
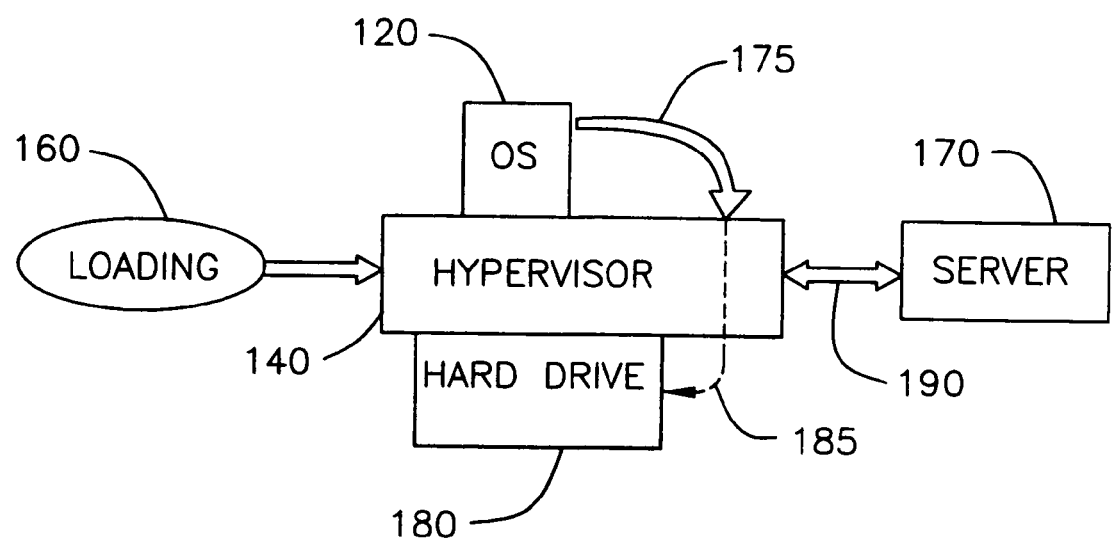
FIG. 2 schematically illustrates a system employing a hypervisor in accordance with at least one embodiment of the present invention.

Essentially there are two main types of hypervisors; a "Type 1" runs directly on hardware and a "Type 2" runs under an existing OS. FIG. 1 shows a Type 1 hypervisor environment (10). OS 1 (20) can be a User Operating System (UOS) such as Microsoft XP. OS 2 (30) is a Service Operating System (SOS) used for client manageability such as Linux, or Microsoft Windows PE. These two OS's, and the hypervisor itself (40) run on the same hardware (50).

Generally, in accordance with a preferred embodiment of the present invention, a hypervisor (140) is first loaded (160) to run under an OS (120). More particularly, hypervisor (140) is preferably loaded first (160), then the OS (120) loads, such that the hypervisor (140) runs under OS (120). Once loaded, the hypervisor (140) then preferably establishes a connection to the central server (170), loads user data, "hooks" disk access modules, and then proceeds along a normal boot path. By "hooking" disk access modules, essentially the hypervisor avails itself to disk access modules so as to be able to trap hard drive read/writes as will now be described.

Accordingly, each time the OS (120) attempts (175) to access a file on a local hard drive (180), the hypervisor (140) can preferably "trap" this access (175), thus preventing what would otherwise be communication (185) with a hard drive (180), and then essentially read (190) the requisite data from the server (170). In other words, when the OS (120) undertakes what is presumed to be a hard drive read or write, the hypervisor (140) traps or intercepts the read or write (175), redirects the read or write to remote storage on the network, and in this manner OS (120) "thinks" it is read/writing the local drive when actually it is going across the network to a remote drive. LAN traffic is also preferably trapped so that there is not a conflict in access. (In other words, normal LAN data is preferably treated differently; priority can preferably be given to reads/writes from a remote drive, to the point of devoting, e.g., up to 80% or more of the bandwidth thereto as opposed to normal network traffic.)

Figure 3:
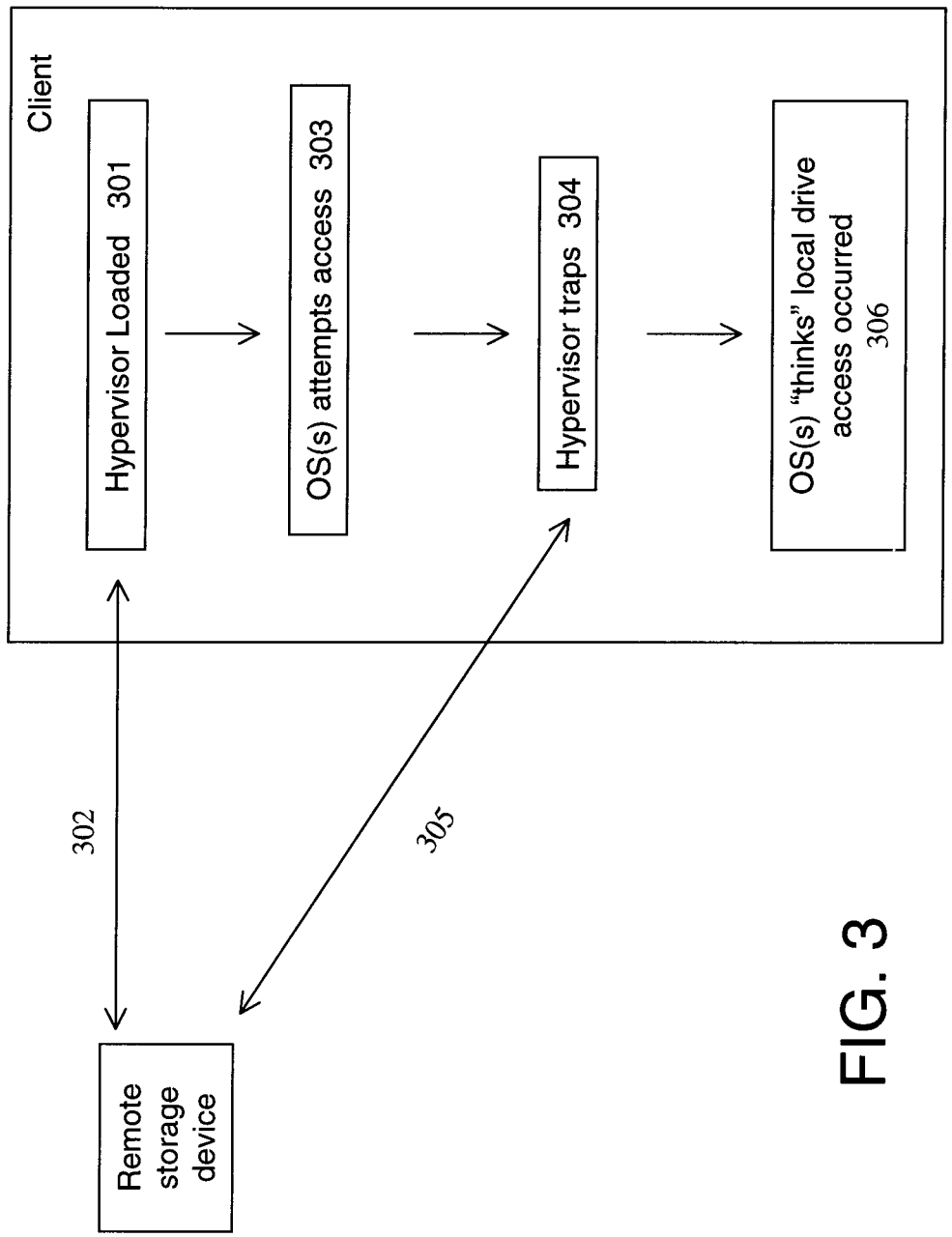
FIG. 3 illustrates employing a hypervisor in accordance with at least one embodiment of the invention.

The above is generally illustrated in FIG. 3. As shown, a hypervisor is first loaded at 301. Once loaded, the hypervisor establishes a connection to a central server at 302. At 303, each time the OS attempts to access a file on a local hard drive, the hypervisor traps 304 the access and reads the data from the server at 305. Thus, the OS "thinks" it is reading/writing to the local drive when actually it is going across the network to a remote drive at 306.

Expressed another way, the OS (120) is essentially "shrink-wrapped" and isolated from components or items with which it would normally communicate (e.g. a hard drive [180]) and the hypervisor (140) acts as a buffer or intermediary through which given types of communication will now take place. Or, a hypervisor (140) in accordance with at least one presently preferred embodiment of the present invention can "fool" a client OS (120) into "thinking" that it is booting from (or performing any type of reading or writing with respect to) a hard drive (180) when instead, for instance, calls (175) to a hard disk read sector are trapped and then sent (190) to the server (170). Accordingly, a hypervisor (140) is preferably configured to capture and accommodate normal booting communication (175) from an OS (120), that itself is normally configured to read or write with respect to a very specific medium (such as a hard drive [180]) and then divert (190) such communication to another location (e.g. server [170]) that can more freely and ably accommodate a variety of booting commands. Thus, the OS (120) does not need to undergo any costly reconfiguration to ensure versatility; the hypervisor (140) acts as a buffer or intermediary to obviate that need. The remote location to which communication is diverted, of course, does not necessarily need to be a server as discussed above; it can be essentially any form of remote storage device, such as a SAN (storage area network) or NAS (network attached storage).

It should be appreciated that although the use of a hypervisor to "trap" reads and writes to a hard drive has just been discussed, a hypervisor can certainly be much more versatile than this. For instance, if an OS is configured to read from or write to something other than a hard drive, a hypervisor can still "trap" such reads and writes. Essentially, in accordance with at least one presently preferred embodiment of the present invention, any read/write from an OS can be redirected by a hypervisor to remote storage.

A variety of known processes are conceivable for securely loading (160) a hypervisor (140). For instance, loading (160) could be accomplished via Flash, via a UEFI driver, or via a secure PXE (Preboot Execution Environment) boot (this could use Boot Integrity Services [BIS] or it could use any secure load method). The presently preferred loading mechanism is the use of a device utilizing the iSCSI (Internet Small Computer Systems Interface) protocol. Additional information on PXE boots is available in the Preboot Execution Environment (PXE) Specification (http colon dot dot slash slash www dot pix dot net slash software slash pxeboot slash archive slash pxespec dot pdf). Additional information on the iSCSI protocol is available in RFC 3720. (http colon slash slash www dot faqs dot org slash rfcs slash rfc3720 dot html). Though essentially any suitable hypervisor may be used in accordance with the embodiments of the present invention, the "Xen" hypervisor is the presently preferred hypervisor. The Xen hypervisor is an open source software development. Additional information about a Xen hypervisor may be found at http colon slash slash www xensource dot com.

It is conceivable to run more than one OS on the base of a common hypervisor in accordance with the embodiments of the present invention. For instance, Windows XP and Linux could run simultaneously on top of a single hypervisor, and the hypervisor could translate reads/writes from both OS's from local to remote storage. In point of fact, there is conceivably no limit to the number of OS's that could run on the base of a common hypervisor.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
a client;
the client comprising a processor that first loads a hypervisor from a memory and thereafter enables an operating system configured to use local storage during boot up to remotely boot;
wherein the hypervisor captures communication actions directed to local storage and one or more LAN accesses from the operating system configured to use local storage during boot up and diverts the communication actions directed to local storage to a remote storage device;
wherein the one or more LAN accesses are treated differently than normal network traffic.

2. The system according to claim 1, wherein said hypervisor captures reading and writing actions from said operating system with respect to a given recipient and diverts the reading and writing actions to said remote storage device.

3. The system according to claim 2, wherein the hypervisor captures reading and writing actions from said operating system that would otherwise be communication with a local storage device and diverts the reading and writing actions to said remote storage device after said operating system is remotely booted.

4. The system according to claim 1, wherein said hypervisor captures reading and writing actions from said operating system that would otherwise be communication with a local hard disk and diverts the reading and writing actions to said remote storage device.

5. The system according to claim 1, wherein said hypervisor acts to communicate with said remote storage device during booting of said operating system.

6. The system according to claim 1, wherein:
said operating system comprises a first operating system;
said system further comprises a second operating system; and
said hypervisor acts to capture communication actions from both of said first and second operating systems and diverts the communication actions to said remote storage device.

7. The system according to claim 6, wherein said loading arrangement securely loads said hypervisor.

8. The system according to claim 7, wherein said loading arrangement acts to employ an iSCSI protocol to load said hypervisor form the remote storage.

9. The system according to claim 7, wherein said loading arrangement acts to load said hypervisor before said operating system is loaded to accommodate remote booting of said operating system by said client.

10. A method comprising:
loading a hypervisor at a client from a memory; and
remotely booting an operating system configured to use local storage during boot up at the client after loading the hypervisor;
wherein the hypervisor is employed to:
capture communication actions directed to local storage and one or more LAN accesses from the operating system configured to use local storage during boot up; and
divert the communication actions directed to local storage to a remote storage device;
wherein the one or more LAN accesses are treated differently than normal network traffic.

11. The method according to claim 10, wherein:
said capturing comprises capturing reading and writing actions from the operating system with respect to a given recipient; and
said diverting comprises diverting the reading and writing actions to a remote storage device.

12. The method according to claim 11, wherein: said capturing of reading and writing actions comprises capturing reading and writing actions from the operating system that would otherwise be communication with a local storage device after said operating system is remotely booted.

13. The method according to claim 10, wherein said capturing of reading and writing actions from the operating system that would otherwise be communication with a local storage device comprises capturing reading and writing actions from said operating system with respect to a local hard disk.

14. The method according to claim 10, wherein said diverting of reading and writing actions comprises diverting reading and writing actions to a central server.

15. The method according to claim 10, wherein:
said step of remotely booting an operating system comprises loading a first operating system;
said method further comprises loading a second operating system; and
said employing of the hypervisor comprises employing the hypervisor to capture communication actions from both of the first and second operating systems and divert the communication actions to a remote storage device.

16. The method according to claim 10, wherein said loading of a hypervisor comprises employing an iSCSI protocol to load said hypervisor form the remote storage.

17. The method according to claim 10, wherein said operating system has not been reconfigured for remote booting.

18. The method according to claim 10, wherein said remotely booting an operating system comprises:
effecting communicating between said hypervisor and a remote storage device during said booting.

19. A program storage device readable by machine, tangibly embodying a program of instructions executable by the machine to perform acts comprising:
loading a hypervisor at a client from a memory; and
remotely booting an operating system configured to use local storage during boot up at the client after loading the hypervisor;
wherein the hypervisor is employed to:
capture communication actions directed to local storage and one or more LAN accesses from the operating system configured to use local storage during boot up; and
divert the communication actions directed to local storage to a remote storage device;
wherein the one or more LAN accesses are treated differently than normal network traffic.

20. The system of claim 1, wherein the remote storage from which said hypervisor is loaded is accessed over a network connection.

* * * * *